C. F. WARD & W. H. CLAY.
VEHICLE WHEEL.
APPLICATION FILED FEB. 4, 1914.
1,138,335.
Patented May 4, 1915.
3 SHEETS—SHEET 1.
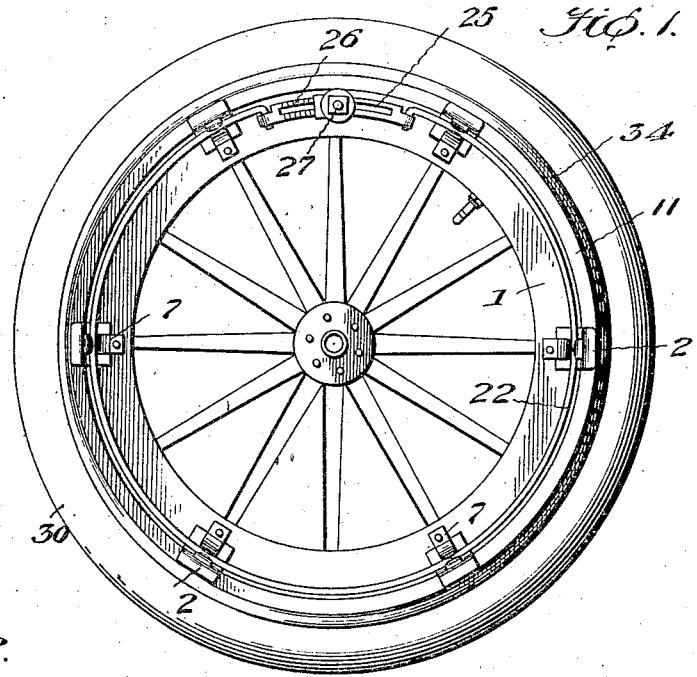
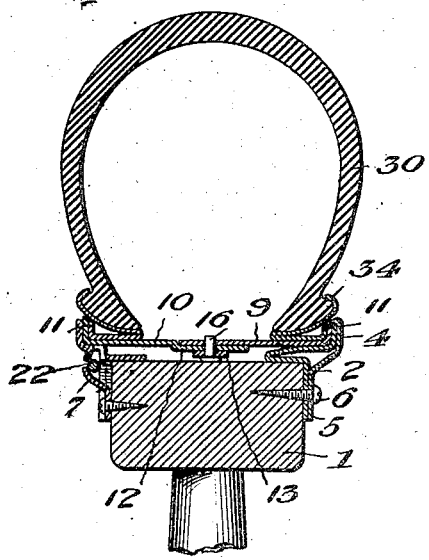
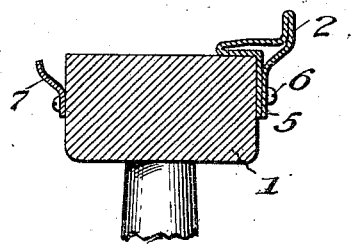
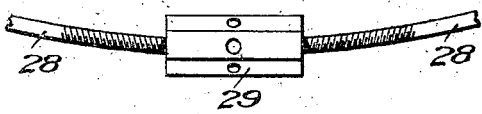
Witnesses
Wm. C. Dashiell.
J. W. Michael, Jr.
Inventors
Charles F. Ward and
William H. Clay
By Edson Bro's
Attorneys C. F. WARD & W. H. CLAY.
VEHICLE WHEEL.
APPLICATION FILED FEB. 4, 1914.
1,138,335.
Patented May 4, 1915.
3 SHEETS—SHEET 2.
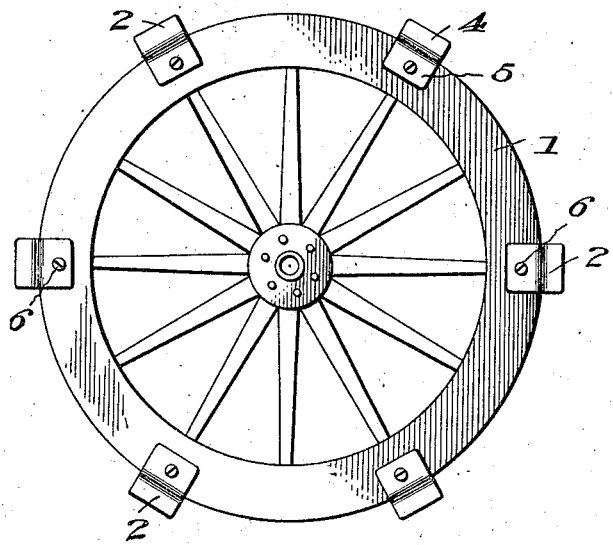
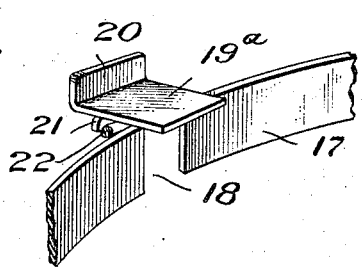
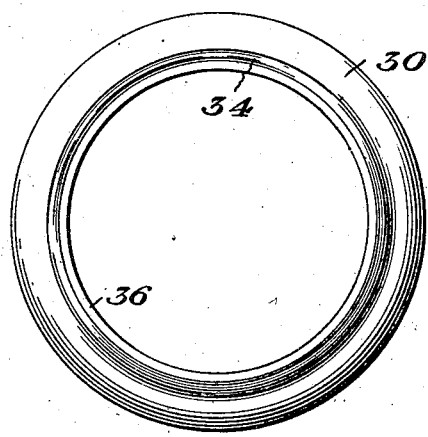
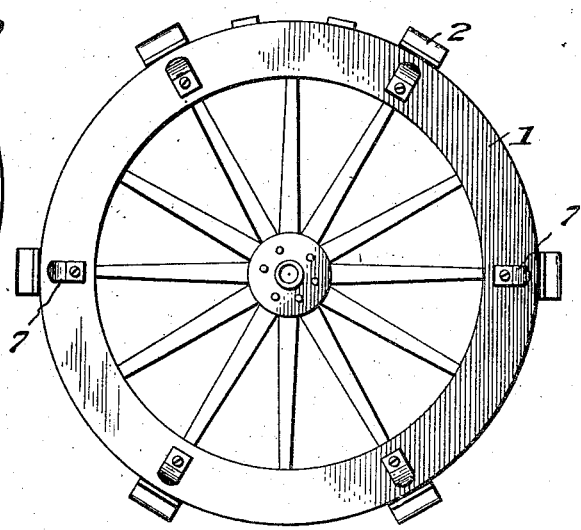
Witnesses
Wm C Dashiell
J. W. Michael, Jr.
Inventors
Charles F. Ward
and William H. Clay
By Edson Bro's
Attorneys

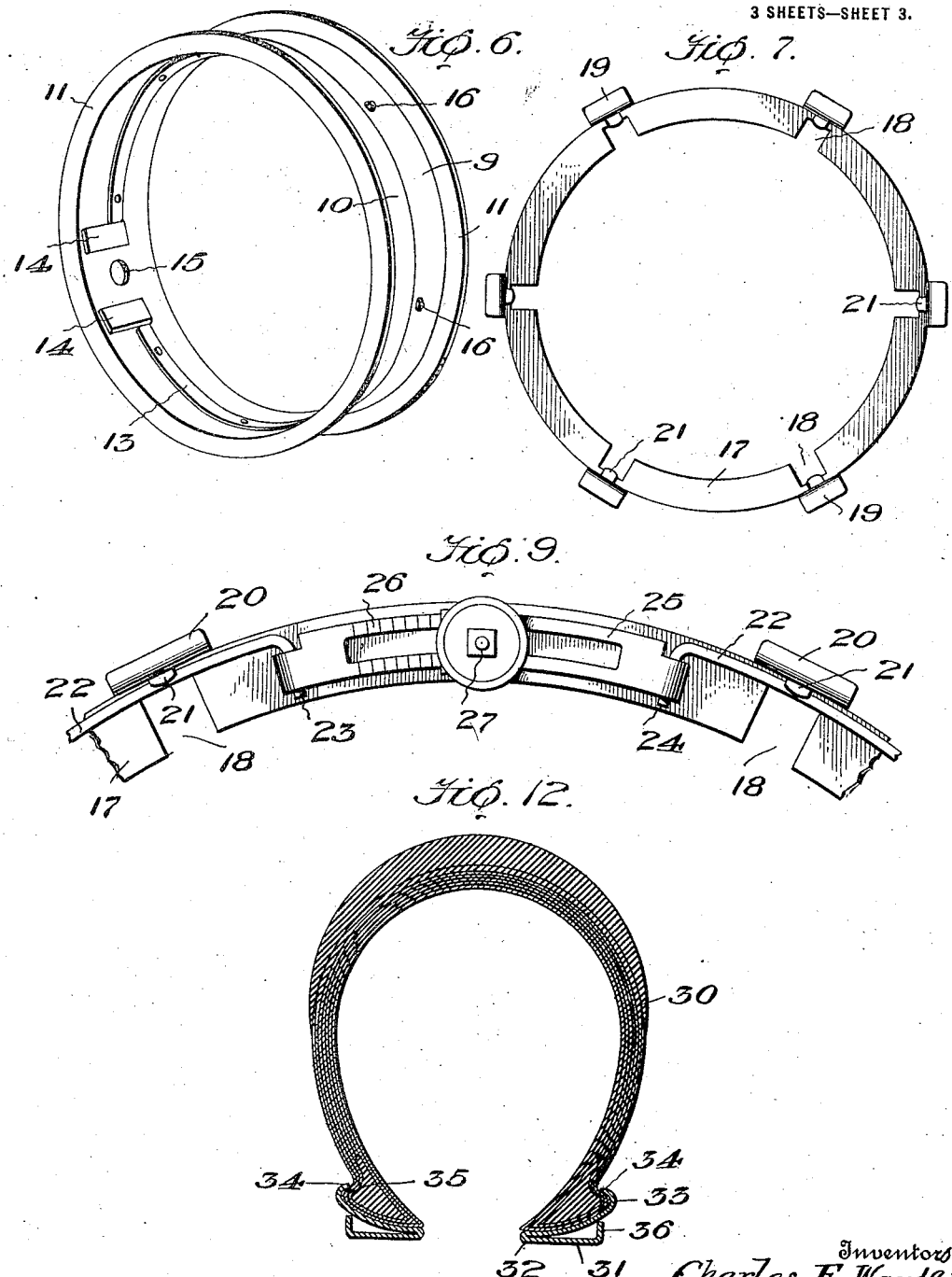

UNITED STATES PATENT OFFICE.

CHARLES F. WARD AND WILLIAM H. CLAY, OF LEXINGTON, KENTUCKY, ASSIGNORS OF ONE-THIRD TO PORTER PRATHER, OF LEXINGTON, KENTUCKY.

VEHICLE-WHEEL.

1,138,335.  Specification of Letters Patent.  Patented May 4, 1915.

Application filed February 4, 1914. Serial No. 816,452.

*To all whom it may concern:*

Be it known that we, CHARLES F. WARD and WILLIAM H. CLAY, citizens of the United States, residing at Lexington, in the county of Fayette and State of Kentucky, have invented certain new and useful Improvements in Vehicle-Wheels; and we do hereby declare the following to be a full, clear, and exact description of the invention, such as will enable others skilled in the art to which it appertains to make and use the same.

This invention is a vehicle wheel of that type which is designed to carry a tire on the rim of the wheel in an inflated condition, and wherein the tire itself may be quickly and readily detached from the rim.

A purpose of the invention is to provide a quickly detachable clencher rim for a tire which will be firmly held in position by a single readily removable locking element having expansible and contractible means which can be operated by a single individual, whereby a tire may be quickly removed or applied to a wheel.

The invention is characterized by a sectional demountable tire rim, the sections of which are interlocked, the rim being locked on the wheel by a single plate having an expansible and contractible element adapted to engage the wheel and rim, and to hold the parts in their relative positions.

The invention consists also, in the features of construction, arrangement and combination of parts hereinafter described, illustrated in the drawings, and particularly pointed out in the appended claims.

In the accompanying drawings: Figure 1 is a side elevation with the parts in position and the tire removed. Fig. 2 is a sectional view through a part of the wheel showing the tire rim and retaining means in position. Fig. 3 is a sectional view through the felly with the rim binding plate and tire removed. Fig. 4 is a view of a part of one face of a wheel with the rim and tire removed. Fig. 5 is a view of one part of the reverse face of a wheel with the rim and tire removed. Fig. 6 is a detail view of a part of the rim plates. Fig. 7 is a detail view of the retaining plate with the expansible member or ring removed. Fig. 8 is an enlarged detail view of a section of the plate showing a retaining lug. Fig. 9 is a detail view of the expansible ring of the plate. Fig. 10 is another embodiment of the expansible ring of the plate. Fig. 11 is a side elevation of a tire with the bearing plate thereon to engage the wheel rim. Fig. 12 is a sectional view through a tire with the bearing plates thereon.

In the embodiment of the invention illustrated in the accompanying drawings, the device is shown applied to an ordinary vehicle wheel wherein the felly is indicated at 1, and may be of any suitable construction and material. On one side of the felly is shown positioned a plurality of angular stops 2, each of said stops may be composed of a single piece of material bent upon itself to provide a bearing plate 3, one end of the plate being turned upwardly to form an upright bearing member 4 as a stop for the rim to be hereinafter referred to, while the other member may be bent downwardly to form a depending flange 5, shown in Fig. 3 as positioned substantially central of the plate 3. The stop may be secured to the felly by any suitable means, shown in the drawings as a screw 6, although it is obvious that if desired, the stops may be formed directly on the felly 1. On the opposite face of the felly there is preferably provided a plurality of retaining clips 7 which are shown as angular plates so secured to the felly as to leave a space between the upper free end thereof and the face of the felly.

The rim of the wheel is preferably composed of two annular abutting members 9—10, each of which is provided with an upstanding peripheral flange 11 which may be of any desired form of contour. One of the rim sections, for example 10, may be provided with a depressed portion 12 (Fig. 2) to form a seat for the extended portion of the opposite member 11, and thereby present a substantially even, continuous surface for the tire. These rim members may be retained in their coöperative relation by a suitable locking band 13, which is shown as extended substantially around the inner face of one of the members, from the spacing plug 14 located near the inner valve aperture 15 in the rim, continuously around to another of the spacing plugs 14, as will be understood from inspection of Fig. 6. This locking band may be composed of resilient material, such as spring metal, and be provided with a plurality of studs 16 which are adapted to pass through the depressed portion 12 of the member 10 and to register with apertures in the member 11 to lock the members 9 and 10 or permit of the separation of the members. This rim when assembled, is designed to be placed over the felly of a wheel into abutting engagement with the upstanding flange 4 of the stop 2.

The rim may be retained in position on the wheel by a suitable annular plate 17, illustrated more clearly in Fig. 7. This plate is shown provided with a series of notches 18 which are adapted to register with the retaining clips 7 on the wheel felly 1 to prevent rotative movement of the annular plate 17 with reference to the felly. On the periphery of this plate 17 there may be provided a plurality of angular stops 19, which are illustrated more clearly in Fig. 8. These stops 19 are designed to abut against the opposite face or flange 11 of the wheel rim, and to coöperate with the stops 2 in retaining the rim on the wheel. Each of the stops 19 is preferably provided with a member 19ᵃ which is designed to maintain the rim separated from the periphery of the felly, to permit of movement of the locking band 13 in the space to be so provided. This member may be provided also with an upstanding flange 20, which is adapted to engage the flange 11 of the rim, and there may be provided also a depending flange 21 which is adapted to be positioned to register with the retaining clip 7 carried by the wheel felly, this depending flange or clip 21 being positioned over the aperture 18 of the plate 17. A suitable expansible and contractible binding element may be mounted upon the retaining plate 17, and this binding element is shown in the drawings as a ring 22 which is adapted to be positioned between the retaining clips 21 of the plate 17 and the clips 7 of the felly 1, so that when the parts are placed in their assembled position, the ends 23—24 of the binding ring 22 may be drawn together to bring the ring 22 into forcible engagement with the clips 7, and thereby holding ring 17 firmly into engagement with the felly 1. If desired, the ends 23—24 may be provided with slidable plates 25 having roughened or corrugated faces, indicated at 26, adapted to be engaged by a suitable binding nut 27. In Fig. 10, however, the ends of the ring 22 are shown reversely threaded as at 28, and these ends are engaged by a sleeve 29, whereby the retaining of the sleeve in one direction, will draw the ends together and in a reverse direction will cause the ring 22 to assume a greater diameter, as will be readily understood.

The tire 30 may be of any preferred type, and if a clencher tire is to be employed, there may be provided an annular plate which is adapted to engage a shoulder of the tire, and also to engage the rim and abut against the flange 11 thereof to hold the tire in position, at the same time preventing the rim from cutting the material of the tire. This annular plate is disclosed in Figs. 11 and 12, as having a base 31 bent upon itself at 32 to produce an upwardly inclined section 33 and a turned over section 34, to form a channel at 35 to receive the clencher portion of the tire. The other edge of the plate may be turned up as at 36 into engagement with the inclined portion 33 to not only strengthen the material, but to serve as an abutting surface to engage the flange 11 of the rim. It is to be understood that one of these plates may be used on each side of the tire. These clencher plates are designed not only as retaining means, but are adapted to remain on the tire until the same has been completely worn out, it being unnecessary to remove the plates from the tire when it is desired to enter the tire casing. Moreover, these plates are designed to lengthen the life of the material, as they present no roughened surfaces to grind or cut the casing. The particular shape of the rings is designed to prevent sticking of the tire in its rim and thereby obviate a great deal of the difficulties now found in removing tires from the rim.

In operation, the wheel felly may be provided with the stop members 2 and the retaining clips 7 at suitable spaced positions thereon. One section of the rim 9 may now be placed in position against the stop members 2. A tire may now be provided with the annular clencher plates 33, which are designed to receive the clencher portion of the tire into the channel 35 formed therein. As previously stated, these plates are to be permanently attached to the tire. These plates 33 may be of a contour to fit the flanges 11 of the rim, and the lower member 31 of the plate may be of such material that it will act as a resilient base for the tire. Having placed the tire in position on the rim, the other section 10 of the rim is now slipped over the felly 1 and into engagement with the tire, until the locking band 13 of this section, and the studs 16 come into locking engagement with the section 9, to hold the rim members into a unitary rim structure. The plate 17 may now be placed into position to have its angular stop portion 20 come into engagement with the flange 11 of the plate 10, whereupon the contractible ring 22 on said plate 17 may be drawn together by any suitable means, until the ring engages the clips 7 of the felly and binds the plate against the felly, whereupon the broad portion 19ᵃ of the ring stops 20, and the portion 3 of the stops 2 will serve to maintain the rim out of contact with the peripheral edge of the felly 1, thereby permitting movement of the locking band 13 within the space so formed.

It is obvious that when it is desired to gain access to the interior of the tire casing, it will only be necessary to release the binding action of the ring 22 by rotating the nut 27 or 29, whereupon the ring 17 may be removed as an element from the wheel, the clencher portions 9 and 10 removed from the wheel and the section 10 of the clencher rim removed from the tire by releasing the locking band 13, whereupon the tire and its annular plate 33 may be lifted from the clencher section and access gained to the interior of the tire without injury to the parts.

It is obvious that minor changes in the form and construction of the parts may be made without departing from the spirit of the invention, and the right is reserved to make such changes and alterations therein as fairly fall within the scope of the appended claims.

Having thus described the invention, what we claim as new and desire to secure by Letters Patent is:

1. In a vehicle wheel, a demountable rim composed of a plurality of annular abutting members adapted to be placed edge to edge to form a substantially continuous surface for the tire, each of said rim members being provided with a flange; means to lock said rim members in position, and a plurality of annular plates adapted to be positioned permanently on the tire, and to be brought into binding engagement with the flanges of the demountable rim of said wheel.

2. In a vehicle wheel, an annular plate adapted to receive the clencher portion of a tire comprising a base, an inclined portion and a turned over portion, said turned over and inclined portions forming a channel for the clencher portion of a tire, said base terminating in an upstanding flange in juxtaposition to the inclined portion.

In testimony whereof, we affix our signatures, in presence of two witnesses.

CHARLES F. WARD.
WILLIAM H. CLAY.

Witnesses:
IRA S. STEPHENSON,
E. F. UNDERWOOD.